April 24, 1934.     A. HERTEL     1,956,443
APPARATUS FOR PUNCHING BELT JOINTS
Filed Sept. 29, 1930     3 Sheets-Sheet 1
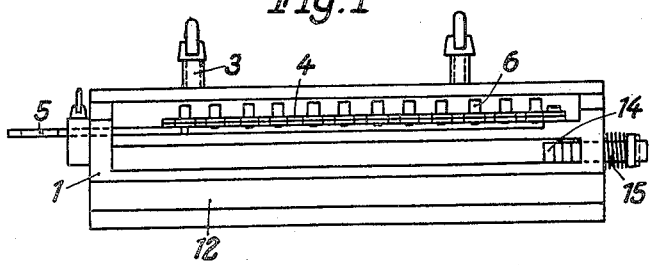
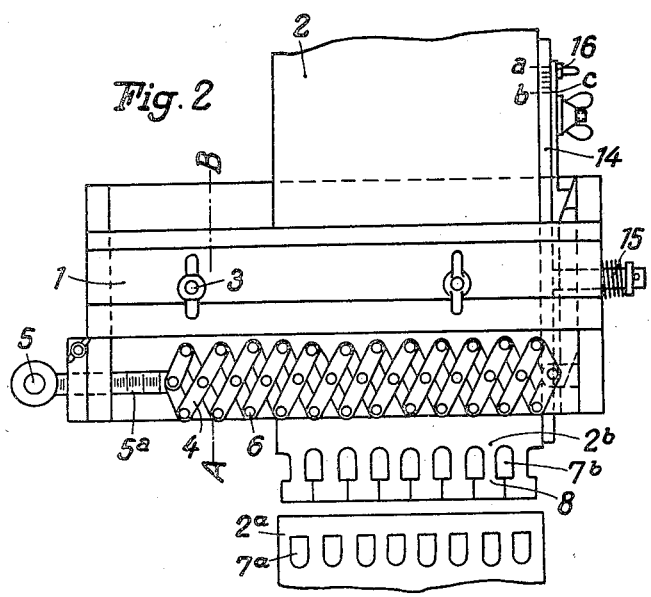
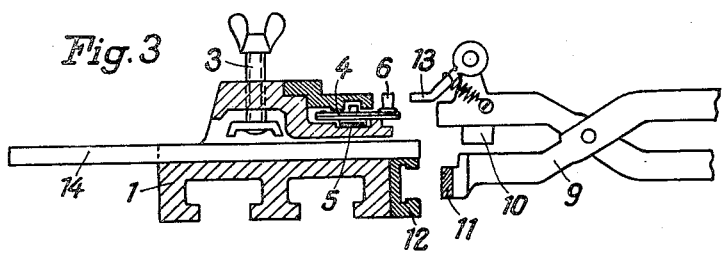
Inventor:
A. Hertel
By Marks & Clerk
Attys.

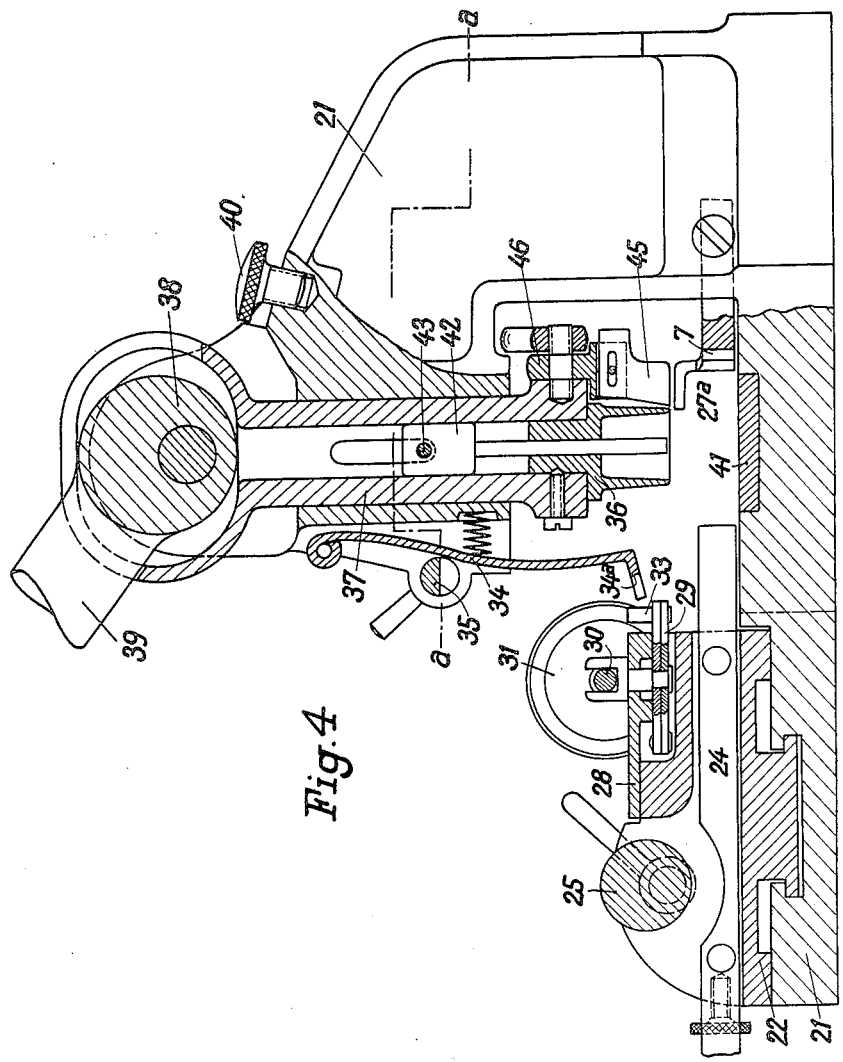

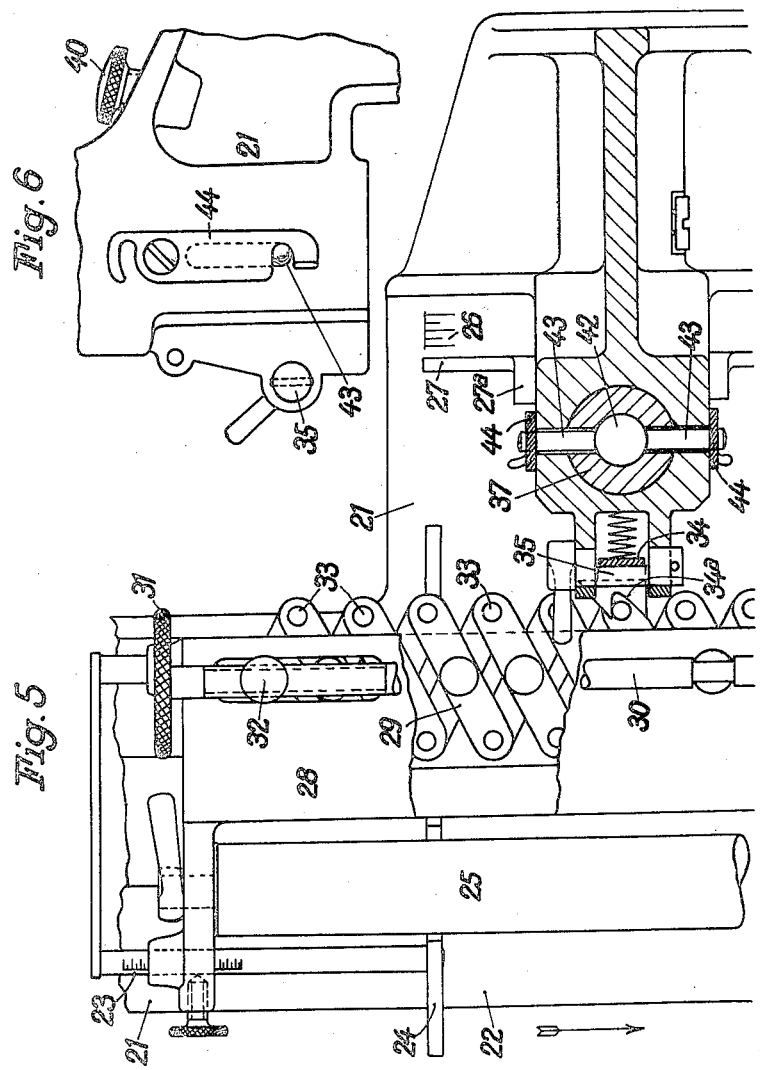

Patented Apr. 24, 1934

1,956,443

UNITED STATES PATENT OFFICE 1,956,443

APPARATUS FOR PUNCHING BELT JOINTS

Anton Hertel, Heidelberg, Germany

Application September 29, 1930, Serial No. 485,271
In Germany October 19, 1929

13 Claims. (Cl. 164—91)

Non-metallic belt joints are known, in which the two belt ends are provided with parallel rows of elongated holes. In the case of one end the elongated holes are slit with a knife or the like up to the edge, so that they form anchor or T-shaped tabs which are inserted into the holes in the other belt end and anchored therein.

For belts of different thickness and width the distance between the holes is made different. The present invention relates to an apparatus for making such belt joints, with which the distance between the holes can in each case be quickly and accurately adjusted. According to the invention the distances between the holes are adjusted with an adjustable lazy-tongs arrangement. The pivot pins of the lazy-tongs, which face the belt end, may serve as gauges for the tool or punching device, with which the holes are made.

In the accompanying drawings two constructional examples of the arrangement according to the invention are illustrated.

Figs. 1 to 3 show the first constructional form, in which the tool is a belt punch. Fig. 1 being a front elevation, Fig. 2 a plan view and Fig. 3 a section on line A—B of Fig. 2, showing a portion of the belt punch.

Figs. 4 to 6 show the second constructional form, in which the hole-making tool is a punch, Fig. 4 being a longitudinal section, Fig. 5 a plan view, partly in section on line a—a of Fig. 4 and Fig. 6 showing a portion of the apparatus in side elevation.

In the first constructional example the belt 2 (Fig. 2) is held in a frame 1 by clamping screws 3. For determining the distances between the holes the lazy-tongs arrangement 4 is provided, which is adjusted by a lateral handle 5 along the scale 5a and is held in each position by a clamping screw. The pivot pins 6 of the lazy-tongs 4 are made to form gauges and in each case indicate the location of the holes to be punched. By adjusting the lazy-tongs 4 all the distances between the holes are altered positively by the same amount.

In Fig. 2 the two finished belt ends are also shown. One belt end 2a has a series of parallel elongated holes 7a, the holes 7b in the other belt end 2b, which are offset with respect to the holes 7a, being slit up to the edge, so that anchor or T-shaped tabs 8 are formed, which are drawn separately through the holes 7a and anchored therein.

The belt punch 9 with the punch 10 (Fig. 3) has on its lower jaw a sliding piece 11, which is guided in a guide rail 12 on the frame 1. To the upper jaw of the belt punch is pivoted a spring-loaded detent 13, the object of which is to hold the belt punch 9 in any desired position on the frame 1. It may for instance be forked at the forward end and embrace the pivot pins 6 of the lazy-tongs 4.

In order to shift the punch 10 from one punching position to another, it is necessary to swing the detent 13 upward so as to clear the gauge 6.

When the second belt end is to be perforated the belt 2 must be pushed so far laterally into the frame 1 that the holes are offset with respect to one another by half the distance between the holes. This is effected by means of an adjustable edge stop 14 (Figs. 1–3), which is slidable in the direction of the width of the belt, a guiding pin 15 sliding in a hole in the side wall of the frame 1. The displacement is effected by means of a wedge shaped bar 16 (Fig. 2), which can be slid in the longitudinal direction of the belt and is adjusted by means of a mark $c$ alternately to a mark $a$ and a mark $b$ of the stop member 14.

Owing to its great simplicity, this device is cheap and enables the holes in the belt to be punched out in a clean and accurate manner. It is particularly suitable for small works.

In the case of larger constructional forms, it is advisable to make the clamping frame in the form of a slide and to guide it along the stationary machine frame. In this arrangement the detent is mounted on this frame and may be made capable of being put out of operation. Such a constructional form is shown in Figs. 4–6.

The machine frame 21, which also acts as the working table, is formed at its end as the bed for the slide 22. In this slide 22, the belt (not shown) is clamped by an eccentrically mounted roller 25, after being adjusted at the lateral stop 24, which can be displaced along the scale 23. The correct longitudinal position of the belt is determined in this arrangement by an end stop 27, which is adjustable to a scale 26, and which overlaps the belt with angular extensions 27a and holds it firmly on the table top 21.

The lazy-tongs arrangement 29, which is protected under a cover 28, is displaced by means of a hand wheel 31 by a spindle 30, which transmits the motions to the extreme members of the lazy-tongs by means of oppositely threaded nuts 32. The pivot pins 33 facing the belt end are formed so as to act as gauges. They engage in the notch 34a of the spring-loaded detent 34 which is bent over at its lower end (Fig. 5). On the slide 22 being drawn forward in the direction of the arrow (Fig. 5 to the left) the detent will first spring backwards and will then snap in between two pins 33. On the slide being drawn further forward the next pin 33 will engage in the notch 34a. This has the advantage that, without displacing the stops, the rows of holes in two belt ends can be punched out offset with respect to one another by half the pitch of the holes. By turning the cam arrangement 35, the detent 34 can be put out of operation (Fig. 4).

The punch 36 consists of a hollow cutter of elongated cross section, which is fixed in a plunger 37. The working motion is transmitted by means of an eccentric drive 38 to the plunger 37. The swing of the lever 39 may be so regulated by an adjusting screw 40 that, in every case, the cut will be made right through the leather without the cutter 36 cutting more than necessary into the brass insertion 41 in the working table.

In the bore of the plunger 37 and of the punch 36, the holding mandrel 42 is journalled, which remains stationary during the punching operation and, on the tool being retracted, forces the punched out leather core out of the punch 36. The holding mandrel 42 is guided by guiding pins 43 in slots in the plunger 37 and the casing 21. In the position of the parts shown in Fig. 4, these slots coincide. When the punch 36 is to be changed, the mandrel 42 is raised by the guiding pins 43. For locking the mandrel in its extreme positions, two rotatable locking members 44 are provided (Fig. 6) which, when it is operative, hold it in its bottom position, while, when raised, lock both the mandrel 42 and the plunger 37 in the top position.

In this constructional example, the holes in one belt end are slit up to the edge in one operation with the punching of the holes. For this purpose, a cutter 45 is mounted in a holder 46 on the plunger 47, so as to be adjustable thereon, which cutter can be turned about the pivot and clamped in any position.

What I claim is:—

1. Apparatus for making rows of holes in the ends of driving belts to form non-metallic belt joints, comprising an adjustable lazy-tongs mechanism for adjusting the spacing of the holes according to the width of the belt and a cutting punch for making the holes, and a stationary holding mandrel in the cutting punch adapted to eject punchings from the punch when the said punch is retracted.

2. Apparatus for making rows of holes in the ends of driving belts to form non-metallic belt joints, comprising an adjustable lazy-tongs mechanism for adjusting the spacing of the holes according to the width of the belt, a cutting punch for making the holes and a stationary holding mandrel in the cutting punch adapted to eject punchings from the punch when the said punch is retracted, and means for raising the holding mandrel to enable the cutting punch to be changed.

3. Apparatus for making rows of holes in the ends of driving belts to form non-metallic belt joints, comprising an adjustable lazy-tongs mechanism for adjusting the spacing of the holes according to the width of the belt, a reciprocating plunger, a cutting punch for making the holes mounted in the plunger, a stationary holding mandrel in the cutting punch adapted to eject punchings from the punch when the said punch is retracted, guiding pins for raising the holding mandrel to enable the cutting punch to be changed, and locking members adapted to lock the holding mandrel in its working position and also adapted to lock the holding mandrel and the plunger in a raised position.

4. Apparatus for making a row of anchor-shaped tabs in the end of a driving belt to form a non-metallic belt joint with a belt formed with a row of longitudinal holes at the end, comprising, an adjustable lazy-tongs mechanism for adjusting the spacing of the holes according to the width of the belt and a reciprocating plunger, a cutting punch for making holes in the belt mounted in the plunger, a longitudinally displaceable cutter for cutting slits in the belt extending from the punched holes to the free end of the belt, the said cutter being mounted on the plunger, and means for putting the cutter out of operation when desired.

5. Apparatus for making rows of holes in the ends of driving belts for forming non-metallic belt joints, comprising in combination a lazy-tongs structure having gauges thereon for spacing the holes, said lazy-tongues structure being capable of adjustment for adjusting the spacing of said gauges according to the width of the belt, and a punching device having means thereon adapted to co-operate with said gauges to locate the punching device in successive positions relatively to the belt for punching the holes in proper spaced relationship.

6. Apparatus for making rows of holes in the ends of driving belts for forming non-metallic belt joints, comprising in combination a lazy-tongs structure having pivot pins extended to form gauges for spacing the holes, said lazy-tongs structure being capable of adjustment for adjusting the spacing of said pivot pins according to the width of the belt, and a punching device having means thereon adapted to co-operate with said extended pivot pins to locate the punching device in successive positions relatively to the belt for punching the holes in proper spaced relationship.

7. Apparatus for making rows of holes in the ends of driving belts for forming non-metallic belt joints, comprising in combination a lazy-tongs structure having pivot pins extended to form gauges for spacing the holes, a punching device having a detent mounted thereon, said detent having a notch adapted to engage said extended pivot pins to locate the punching device in successive positions relatively to the belt for punching the holes in proper spaced relationship, and a loading spring for said detent.

8. Apparatus for making rows of holes in the ends of driving belts as set forth in claim 7 and having means on the punching device for displacing the detent against the force of the loading spring therefor to enable the detent to be moved into an inoperative position when required.

9. Apparatus for making rows of holes in the ends of driving belts for forming non-metallic belt joints, comprising in combination a support having clamping means thereon for holding a belt to be punched, a lazy-tongs structure on said support having pivot pins extended to form gauges for spacing the holes, said lazy-tongs structure being capable of adjustment for adjusting the spacing of said pivot pins according to the width of the belt, a punching device with a detent mounted thereon having a notch adapted to engage said extended pivot pins to locate the punching device in successive positions relatively to the belt for punching the holes in proper spaced relationship, said support and punching device having co-operating guiding means for permitting the one to slide relatively to the other in the direction of the width of the belt, the detent being adapted to snap in between two adjacent pivot pins, so as to enable holes to be punched in the belt spaced with respect to the holes punched with the notch in the detent engaging the pivot pins by an amount equal to half the pitch of the pivot pins.

10. Apparatus for making rows of holes in the ends of driving belts for forming non-metallic belt joints, comprising in combination a support having clamping means thereon for holding a belt to be punched, an adjustable lazy-tongs structure on said support having gauges for spacing the holes, a screw spindle rotatably mounted on the support and having right-handed and left-handed screw threads thereon operatively connected to the extreme members of the lazy-tongs structure for adjusting the spacing of said gauges according to the width of the belt and a punching device having means thereon adapted to co-operate with said gauges to locate the punching device in successive positions relatively to the belt for punching the holes in proper spaced relationship.

11. Apparatus for making rows of holes in the ends of driving belts as set forth in claim 5, and having a laterally displaceable edge stop and a wedge-shaped member for adjusting the edge stop into two different positions differing from one another by half the pitch of the holes to be punched.

12. Apparatus for making rows of holes in the ends of driving belts for forming non-metallic belt joints, comprising in combination a frame having clamping means thereon for holding a belt to be punched, a lazy-tongs structure supported in the frame, said lazy-tongs structure having gauges thereon for spacing the holes and being capable of adjustment for adjusting the spacing of said gauges according to the width of the belt, a guide rail on the frame and a punching device for making the holes having means thereon adapted to co-operate with said gauges to locate the punching device in successive positions relatively to the belt for punching the holes in proper spaced relationship, said punching device also having guiding means thereon adapted to co-operate with said guide rail.

13. Apparatus for making rows of holes in the ends of driving belts for forming non-metallic belt joints, comprising in combination a frame having clamping means thereon for holding a belt to be punched, a lazy-tongs structure supported in the frame, said lazy-tongs structure having gauges thereon for spacing the holes and being capable of adjustment for adjusting the spacing of said gauges according to the width of the belt, a spindle having right-handed and left-handed screw threads thereon rotatably mounted in the frame, nuts on said screw spindle in engagement with said screw threads and operatively connected to the ends of the lazy-tongs structure for adjusting the lazy-tongs structure to adjust the spacing of the gauges and a punching device having means thereon adapted to co-operate with said gauges to locate the punching device in successive positions relatively to the belt for punching the holes in proper spaced relationship.

ANTON HERTEL.